US010062529B2

(12) United States Patent
Barker

(10) Patent No.: US 10,062,529 B2
(45) Date of Patent: Aug. 28, 2018

(54) MOTOR KILL SWITCH ARRANGEMENT

(71) Applicant: CORDSAFE LTD, Dorset (GB)

(72) Inventor: John Christopher Holroyd Barker, Dorchester (GB)

(73) Assignee: CORDSAFE LTD., Poole, Dorset (GB)

( * ) Notice: Subject to any disclaimer, the term of this patent is extended or adjusted under 35 U.S.C. 154(b) by 0 days.

(21) Appl. No.: 15/501,294

(22) PCT Filed: Aug. 5, 2015

(86) PCT No.: PCT/GB2015/000229
§ 371 (c)(1),
(2) Date: Feb. 2, 2017

(87) PCT Pub. No.: WO2016/020633
PCT Pub. Date: Feb. 11, 2016

(65) Prior Publication Data
US 2017/0221657 A1  Aug. 3, 2017

(30) Foreign Application Priority Data

Aug. 5, 2014   (GB) .................................. 1413888.7
Sep. 24, 2014  (GB) .................................. 1416884.3
(Continued)

(51) Int. Cl.
H01H 27/00      (2006.01)
B63H 21/21      (2006.01)
(Continued)

(52) U.S. Cl.
CPC ............. *H01H 27/00* (2013.01); *A63B 22/02* (2013.01); *A63B 22/04* (2013.01);
(Continued)

(58) Field of Classification Search
CPC .... H01H 27/00; H01H 13/84; H01H 13/7065; H01H 13/04; H01H 13/704; H01H 13/88;
(Continued)

(56) References Cited

U.S. PATENT DOCUMENTS 2,722,575 A    11/1955  Dobkins
3,210,494 A *  10/1965  Murdock ............. H01H 3/0226
                                                     200/541
(Continued)

FOREIGN PATENT DOCUMENTS

FR         2847059 A1    5/2004

OTHER PUBLICATIONS

International Search Report dated Feb. 4, 2016, for International Patent Application No. PCT/GB2015/000229.
(Continued)

Primary Examiner — Edwin A. Leon
(74) Attorney, Agent, or Firm — Karceski IP Law, PLLC

(57) ABSTRACT

The present invention relates to motor safety devices as used in increasing numbers for the killing of engines or disengaging propulsion units from motors, when there are no operators to maintain control of an apparatus or vehicle such as jet-ski, boat, go-kart and the like or personnel to oversee use of a motorised tool or the like. Motor boat operators on a boat have been known to fall overboard without being detected by the operator of the boat. Such runaway boats have been known to seriously injure the operator of the boat in the water since a runaway boat tends to circle back to the place where the operator has fallen overboard. The present invention is also applicable to other types of equipment such as motorised gymnasium equipment, hand operated power tools, such as agricultural and arboriculturist equipment and wood working tools.

20 Claims, 7 Drawing Sheets

(30) Foreign Application Priority Data

| Nov. 14, 2014 | (GB) | ................................. | 1420315.2 |
| Jan. 12, 2015 | (GB) | ................................. | 1500466.6 |
| Feb. 6, 2015 | (GB) | ................................. | 1502034.0 |

(51) Int. Cl.

| B63C 9/00 | (2006.01) |
| B60K 28/04 | (2006.01) |
| F16P 3/00 | (2006.01) |
| A63B 71/00 | (2006.01) |
| A63B 22/02 | (2006.01) |
| A63B 22/04 | (2006.01) |
| A63B 22/06 | (2006.01) |
| G08B 21/18 | (2006.01) |
| G08B 7/06 | (2006.01) |

(52) U.S. Cl.
CPC ...... *A63B 22/0605* (2013.01); *A63B 71/0054* (2013.01); *B60K 28/04* (2013.01); *B63C 9/0005* (2013.01); *B63H 21/21* (2013.01); *F16P 3/00* (2013.01); *G08B 7/06* (2013.01); *G08B 21/18* (2013.01); *A63B 2071/0081* (2013.01)

(58) Field of Classification Search
CPC ......... H01H 2229/048; H01H 2209/07; H01H 2221/03
See application file for complete search history.

(56) References Cited

U.S. PATENT DOCUMENTS

| 3,774,720 | A | | 11/1973 | Hovey | |
| 3,821,504 | A | * | 6/1974 | Schomaker et al. ... | B60K 28/04 |
| | | | | | 200/318 |
| 4,262,180 | A | * | 4/1981 | Walter .................. | H01H 27/00 |
| | | | | | 200/324 |
| 4,762,968 | A | | 8/1988 | Hilton | |
| 5,105,755 | A | | 4/1992 | Davidson | |
| 6,276,974 | B1 | | 8/2001 | Bouge et al. | |
| 6,352,045 | B1 | | 3/2002 | Takashima | |
| 2005/0272565 | A1 | | 12/2005 | Hao | |
| 2006/0003644 | A1 | | 1/2006 | Okabe | |

OTHER PUBLICATIONS onmby.com Poll, Motor Boat & Yachting, May 2014 issue, p. 31.
Marine Accident Investigation Branch, Accident Report dated Jan. 2014, Report No. 5/2014, for rigid inflatable boat "Milly".
MBY Investigates, "The Truth About Kill Cords" Sep. 2013, pp. 16-20.
MBY Investigates, "The Future of Kill Cords," Oct. 2013, pp. 16-18.
Burnham, Nick, "Skipper of Padstow RIB crash was not wearing killcord," May 17, 2013.
U.S. Department of Homeland Security and U.S. Coast Guard, 2012 Recreational Boating Statistics, May 13, 2013.
U.S. Department of Homeland Security and U.S. Coast Guard, 2014 Recreational Boating Statistics, May 8, 2015.

* cited by examiner

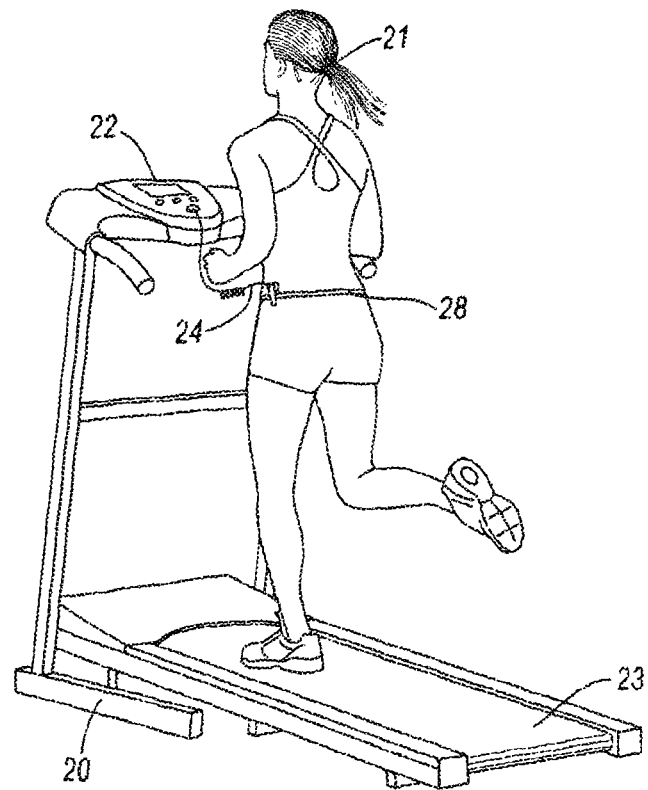
Fig.2b
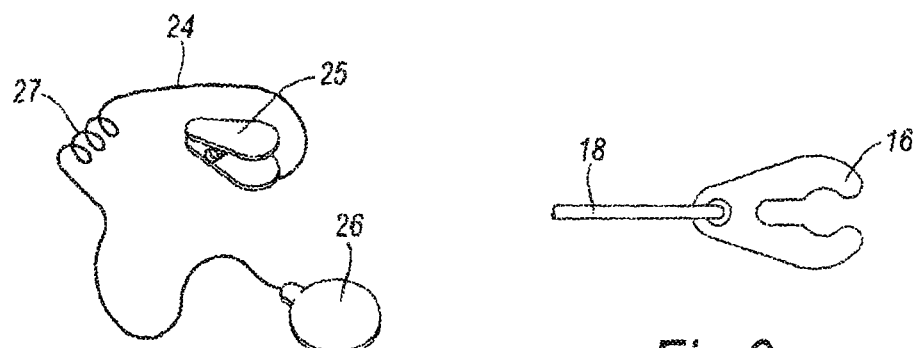
Fig.2c
Fig.3

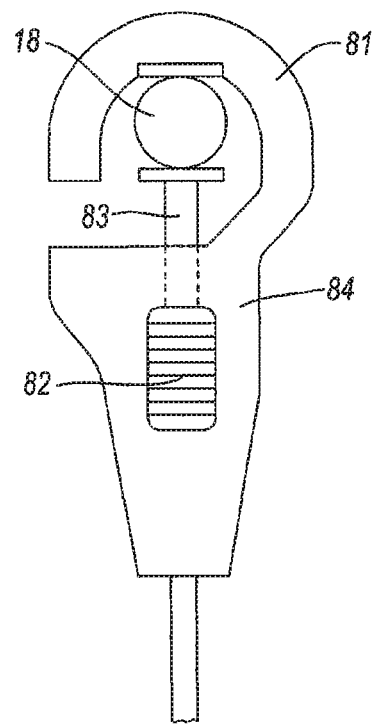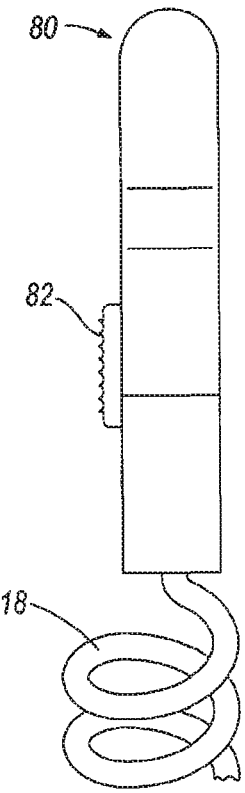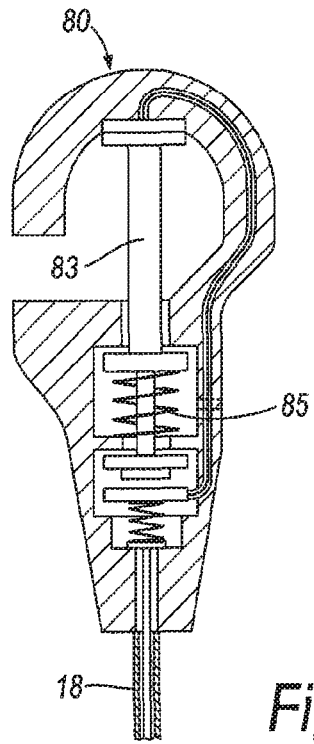
Fig.8a
Fig.8b
Fig.8c

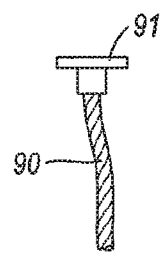
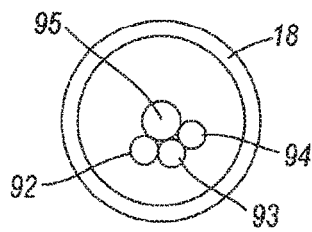
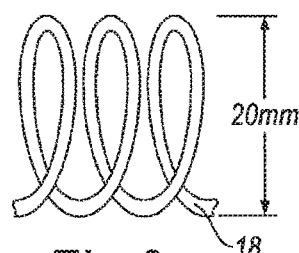
Fig.9a  Fig.9b  Fig.9c
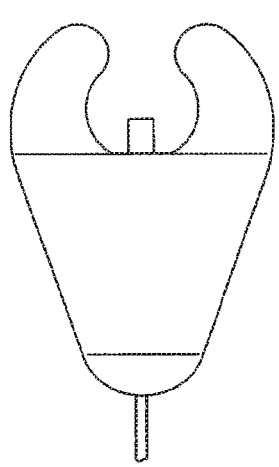
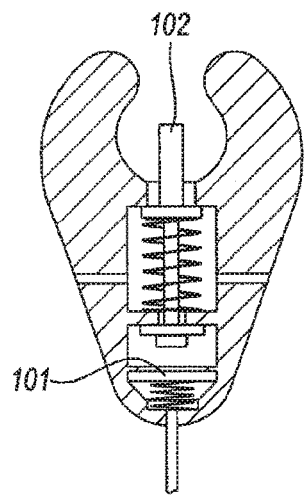
Fig.10a  Fig.10b  Fig.10d
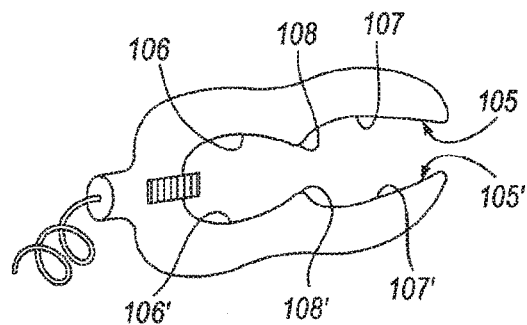
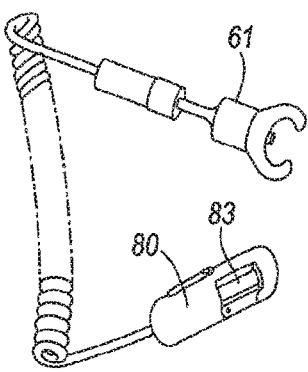
Fig.10c  Fig.10e

MOTOR KILL SWITCH ARRANGEMENT

CROSS-REFERENCE TO RELATED APPLICATION(S)

This is a National Stage Entry into the United States Patent and Trademark Office from International PCT Patent Application No. PCT/GB2015/000229, having an international filing date of Aug. 5, 2015, which claims priority to the following five United Kingdom applications: GB 1413888.7, filed Aug. 5, 2014; GB 1416884.3, filed Sep. 24, 2014; GB 1420315.2, filed Nov. 14, 2014; GB 1500466.6, filed Jan. 12, 2015; and GB 1502034.0, filed Feb. 6, 2015, the entire contents of all of which are incorporated herein by reference.

FIELD OF INVENTION

The present invention relates to a motor kill switch arrangement as used in increasing numbers for the killing of motors such as electrical motors and internal combustion engines or disengaging propulsion units from motors associated with motorised apparatus, when there is no person operable to control the motorised apparatus, such as there being no pilot or crew to maintain control of a vehicle such as jet-ski, boat or go-kart, an operator responsible for agricultural equipment or plant such as a power saw, jumping-jack (compactor), an operator of a treadmill at a gymnasium and the like. In particular the present invention relates to the control and use of such arrangements and associated systems.

BACKGROUND TO THE INVENTION

Equipment with motors of all types will be provided with switches to control operation. However, only a fraction of such equipment is typically provided with kill switches for reasons of safety. For example, personnel are known to fall overboard from a powered motor boat: in the case of the pilot of a motor boat, especially with a lone pilot, the boat may continue to travel through water without an operator in the absence of an operational kill-switch arrangement. Further, such runaway boats have been known to seriously injure the operator of the boat in water since a runaway boat will have a tendency to circle and thus return to the place where the operator has fallen overboard. Such injuries are normally caused by the propeller of the boat cutting the operator in the water, or by the boat itself ramming the operator in the water.

In a completely different field—that of the health and wellness industry—gym equipment such as a treadmill, will be provided with on and off controls and will typically also have a kill switch associated with a lanyard for attachment to the user of a treadmill. In a recent incident, a 47-year-old CEO of a Silicon Valley company died of severe head trauma while exercising at a holiday resort in Mexico. It is well known that treadmill users are advised to use a safety key which stops the belt if one were to fall safety that are well worth reading, whether you own a treadmill or use one at the gym. It is notable that treadmills, in 2012, were the best-selling fitness machines in the United States, and it is reported that such sales accounted for about 25% of the industry's $77 billion in that year.

It is also well known that the use of power tools, for industrial and domestic use, such as power saws are susceptible to accidents. In fact, the woodworking industry has one of the highest accident rates in manufacturing, most of which are caused by contact with moving machinery. In the UK, this has accounted for 25% of all major industrial accidents in recent years, with several deaths in the woodworking industry. Intervention with rotating/reciprocating elements by operators is very often the cause of danger; whilst safety interlocks may be provided, such interlocks tend to slow down operation and are frequently circumvented, although kill switch arrangements per se (in a fashion similar to motor boats) are not provided. It will be appreciated that an operator might need to intervene and perform adjustments, such as adjusting settings, clearing blockages/misfeeds or removing dust/off-cuts and make sure they are trained to do this safely. In a study of 1000 accidents at woodworking machines, 4% occurred on narrow band sawing machines, where accidents often occurred while setting, cleaning, adjusting and maintaining a machine while a blade was still in motion, with an override of a safety function.

In order to prevent runaway motorised personal watercraft, devices such as a lanyard and an emergency shutoff device have been provided from the 1980s. For example, the watercraft could be a jet-ski and the lanyard switch ensemble includes a stop switch that protrudes from a handlebar arrangement and a claw-like lanyard lock plate engages the stop switch to allow an ignition system of an engine to operate. The lock plate includes a lanyard and a wrist strap for attaching the lock plate to an operator's wrist or a clip for attaching the lock plate to the operator's clothing so that if the operator falls off the watercraft during operation, the lock plate will be disengaged from the stop switch so as to kill the engine.

A lanyard lock plate can be a plastic mechanical clip, sometimes called a "latch-key", a "key", sometimes a "clip", which slips onto the outside of an associated kill switch of the boat engine. The kill switch is typically located on the control or instrument panel of a boat and comprises a movable spring-loaded part which must be held in a certain position for the boat to run. The kill-switch key must be distinguished from a key used to operate a boat—or other motorised personal vehicle generally, since the key is operable to enable the vehicle to move and so, in one sense, could disengage a drive shaft, for example, although typically disables the ignition such that the engine is killed. Such a key can operate with a spring-biased element which works with the spring loaded portion of the switch and can be referred to as a latch-key—i.e. is distinguished from an ordinary metal turn-key, operable with other control systems with a boat etc. Should the operator fall overboard, the lanyard would become taught and would subsequently pull the latch-key from the switch, breaking the electric circuit of the engine ignition system, turning off, or "killing" the engine.

In U.S. Pat. No. 6,352,045 (Yamaha) a kill switch and engine control system is shown for a jet ski. U.S. Pat. No. 3,774,720 and U.S. Pat. No. 5,105,755 describe safety switch systems for marine vehicles in which the ignition system of an inboard motor or an outboard motor is linked to the extension of a ladder or the latching or unlatching of a gate, or a series of gates. However, such systems may be easily overridden by the simple pressing of a switch. Unfortunately, a simple switch override often results in the same type of accident because such overriding is accomplished quickly and easily.

U.S. Pat. No. 6,276,974 teaches of a safety system for a boat having a motor and an element movable between a latched and unlatched position for gaining access to the boat. The system includes a switch which is normally in a closed position. The switch is opened when the movable element travels to the unlatched position. At that point, the switch interrupts the ignition circuit of the motor. Thus, the movable element must be latched or travel to the latched position before the ignition circuit will permit the motor to run. However, this system also includes an override device for the switch, thus making the safety system liable to fail.

There are at least two marine wireless kill-cord systems on the market, which both rely on small battery-powered radio transmitters worn around the neck or securely clipped on. A continuous signal is sent to a control box mounted on the helm. As soon as contact with the remote fob is lost the engine is cut. They have been tested and seem to work well, but are not widely used as the market seems to be driven by the outboard and sports boat manufacturers in the US. The additional cost, complexity and fear of litigation in view of a possible failure to operate are all factors putting manufacturers off the replacement of the existing manual kill-cord, typically comprising a hard wire/cord system.

In May 2013, a speedboat in the waters near Padstow in Cornwall crashed, killing the pilot—a father—and his daughter. The pilot was not wearing a safety cord, which could have stopped the engine, the rest of their family were thrown out of their vessel. The United Kingdom's Marine Accident Investigation Branch (MAIB) said the pilot was not using the vessel's kill-cord correctly. In 2012, in a similar incident in the Camel estuary, the pilot and passenger of a rigid inflatable boat (RIB) were thrown into the water with the empty vessel running in circles "at high speed" before eventually running out of fuel. The pilot was not wearing a cord. At the Southampton International Boat Show in 2000, a young pilot died after he was thrown from a speedboat and subsequently run over by the boat as it circled in the water. Again, the pilot was not wearing a cord.

There are many owners of motorised pleasure craft who have craft with significant levels of power and capable of enabling boats to reach speeds of 50 mph (80 km/h) and above relatively straightforwardly. A very high-powered boat can have a quicker response time than many sports cars, since the propellers of an outboard or outdrive cause the thrust to be changed rapidly, without the feedback that a motorist will experience. Just as a car might flip on a sharp bend, it's easy to be thrown out of a boat at speed. A properly fastened kill-cord would cut a boat's engine if the pilot fails out of a motor boat.

Presently, there is no legal requirement for a kill-cord to be fitted to any kind of boat in the Recreational Craft Directive (RCD), which is the safety standard to which all boats in the EU have to conform. There is however a section in the Inland Waters Small Passenger Boat Code which states that, "All inflatable boats, those fitted with buoyant collar and open boats able to achieve planing speed, should, if they have remote throttle controls, be fitted with a killcord, which must be used at all times". Nonetheless, despite the lack of boatbuilding legislation, most outboard engine manufacturers do supply a kill-cord system with every engine sold and most manufacturers of sports boats, rigid inflatable boats (RIBs), including those powered by inboard engines, choose to fit them. This is believed to stem from the threat of litigation, especially in the United States. One engine manufacturer has offered complimentary Royal Yachting Association tuition with the purchase of one of their outboards from 50 hp upwards, which training involves use of kill-cords. Notwithstanding the lack of legal obligation for leisure boat owners to wear a kill-cord fitted to the boats, there may be a clause in an insurance policy which mandates the correct use of a kill-cord. Commercial operators are typically governed by a code of practice which requires the use of a kill-cord when fitted.

Various alternative approaches have been considered, such as, the provision of pressure sensors on a steering wheel or helm seat, which sense whether the helm is occupied or not and that kill an engine if not depressed for a certain period of time, or a GPS device attached to the helmsman which cuts out when outside a certain range of the boat. Other suggestions are optical or thermal sensors similar to a burglar alarm. Many prior art devices lack essential simplicity and low cost of a lanyard system, they have to be either installed at the factory or inconveniently retro-fitted by a skilled electrician—noting that it can be extremely difficult to adapt hard-wired systems to the diverse range of boat instrument panels and wiring configurations. Some boat builders favour wireless kill-cords but they are restricted by what is warranted by the engine suppliers and many inboard engines used in small open boats have no warranted killcord option.

Safety devices of the type discussed above, be they a lanyard or transmitter, can be worn by the pilot operator of a boat by placement on a lanyard about the neck of the pilot or on a strap which may fit around the wrist or ankle of the pilot, the torso of a user of gym equipment or a lanyard associated with a power-tool. In the marine environment, in order to ameliorate the issue of having a tether attached to the body, some life-jackets or buoyancy aids can be provided with kill-cord attachment loops on both sides. In the agricultural and building trades, safety devices are often circumvented, in part arising from the macho cultures of such trades and, in part, arising from the simple inconvenience of having a tether attached to one's body. It is notable that fear of an accident will not provide a guarantee that a safety tether will be attached.

Marine accidents where a boat or the propeller of a boat has struck an operator in the water have occurred in the past with devastating consequences. Complacency with regard to safety among powerboat users is believed by some to be at the root of the problem. Whilst fatal injuries from treadmills are rare—between 2003 and 2012, there were 30 deaths associated with treadmills (an average of three deaths per year) according to a Consumer Product Safety Commission based in the US, other injuries—such as ankle sprains or skinned knees—are more common (in 2014, there were about 24,400 injuries in the US associated with treadmills that required a visit to a hospital accident and emergency department).

OBJECT OF THE INVENTION

The present invention seeks to provide a solution to or at least ameliorate the problems addressed above. The present invention further seeks to provide an improved kill-switch/kill-cord device/apparatus/system. In particular, the present invention seeks to provide a kill-switch/kill-cord device/apparatus/system whereby the kill-switch/kill-cord device/apparatus/system cannot be simply circumvented, be avoided by forgetfulness or inadvertence.

STATEMENT OF INVENTION

In accordance with a general aspect of the invention, there is provided an apparatus having a motorised drive assembly operably controlled by an operator and having a kill-switch arrangement, the kill-switch arrangement comprising: a switch assembly associated with the apparatus, whereby motor drive is permitted in an operable state; a latch-key member operably fitted to the switch assembly, a lanyard; an operator clip operably attached to an operator; wherein motor drive of the apparatus is not possible unless the latch-key member is operably associated with the switch assembly; wherein the arrangement further comprises at least one alarm element whereby an alarm is indicated (activated) in the event that the operator clip has not been properly associated with the operator. The latch-key member is operably associated with the switch assembly only when the operator clip is fastened about an operator, user, pilot, driver of the apparatus or vehicle—to be referred to as the operator hereinafter. The lanyard with operator clip can be conveniently (or least inconveniently) fastened about the ankle of an operator with regards to marine operators, with a hook associated with the lanyard being attached around a part of the lanyard distal to the hook, whereby to allow the lanyard to form a loop about the leg. The latch-key may co-operate with the operator clip when not operatively arranged with an apparatus having a motor, such as a motorised vehicle, so that the alarm does not sound. In the alternative, the alarm circuit may include the latch-key such that when the latch-key is not operatively arranged with the kill-switch assembly, then the alarm does not sound. The switch assembly can be associated with the apparatus or vehicle in a number of ways. In the case of a boat, the switch assembly may be associated with an outboard motor, an inboard motor, in the area about the tiller or steering wheel of an operator console, or in one of multiple positions of a boat where control of the boat is possible and be easily enabled, for example, by an outboard motor and an operator console or by an operator console on the first deck and by an operator console on a fly-bridge. In the case of a treadmill the tether can be fastened to a belt or form a loop with a torso of an operator of a treadmill. With regard to the use of a power tool, the length of the lanyard must not interfere with a safe operation of the tool.

Conveniently, the switch assembly is associated with a motor of the apparatus or vehicle such that the motor does not operate when the latch-key member is not operably associated with the switch assembly. Alternatively, wherein the switch assembly is associated with an output of a motor of the vehicle such that the motor cannot enable propulsion of the vehicle to occur when the latch-key member is not operably associated with the switch assembly, for example, a clutch assembly can be operated upon the or each personnel clip being worn. Notwithstanding this, there can be provision within such a system, for a grace period of, say five-ten seconds to allow for a transfer in responsibility of operation from a first operator to a second operator. In the event that the motor operates through a gearbox-clutch arrangement, then the apparatus may permit movement of the motor, but not enable drive to be transmitted to a tool drive/propeller shaft etc.

The latch-key member can associated with the switch assembly in many ways. For example, the latch-key member and assembly may associate with each other by way of magnetic attraction, a simple plug-in/pull out connector, by means of a detest system—such as a bayonet fastening, or by means of a resiliently biased arrangement. For marine environments, the system ideally has as few moving parts as possible and any such moving parts are protected by protective flexible membranes or similar, where appropriate.

The alarm element can comprise any one or more of a number of elements such as a warning buzzer, sire n or other sound generating system, a warning light, such as a strobe light—bearing in mind that many recreational vehicles such as speed-boats are often more likely to be employed when the sun is very bright and needs to be visually attention catching under such conditions, a vibratory device for placement in a pocket etc. in a manner similar to those presently employed by mobile phones. The alarm element can be associated with the latch-key, the operator clip, can be operably adjacent the latch-key and be connected by a second lanyard member to the operator clip, can be operably adjacent the operator clip and be connected by a second lanyard member to the latch-key or can be distinctly placed apart, connected to each of the latch-key and the operator clip by first and second lanyards. The alarm element, akin to the switch assembly, can also be associated with the vehicle in a number of ways and the alarm element may be distributed in that it can be provided by one or more alarms about a vehicle and can be on, for example, a boat as well as an operator clip. In the case of a boat, the alarm element may be associated with an outboard motor, an inboard motor, in the area about the tiller or steering wheel of an operator console, or in one of multiple positions of a boat where control of the boat is possible and be easily enabled, for example, by an outboard motor and an operator console or by an operator console on the first deck and by an operator console on a fly-bridge.

The motorised apparatus can be a power tool, agricultural equipment or plant such as a power saw, jumping-jack (compactor) and the like, an exercise apparatus such as a treadmill for use in a gymnasium, or a vehicle can be selected from the group comprising motor boat such as a dinghy, RIB, sports-boat (speedboat), cabin cruiser, etc., jet-ski, golf buggy, motorcycle, lawn-mower and tractor. In accordance with another aspect of the invention, there is provided a kill-switch arrangement for use in such motorised vehicles.

The alarm may provide audible, visual, electrical indicators or a combination of such. The alarm may increase in intensity/sound level/repeat rate. Additional alarms may be provided as the alarm time increases. There can be provision for a delay in an alarm sounding, for operator exchange. The alarm can be provided with non-rechargeable or rechargeable electrical cells. The assembly can be provided with an induced current charging system as part of the arrangement, whereby a support cradle for the charger can assist in maintaining the equipment in a central place, conveniently close to the controls of the vehicle, without having exposed electrical terminals.

BRIEF DESCRIPTION OF THE FIGURES

For a better understanding of the present invention, reference will now be made, by way of example only, to the Figures as shown in the accompanying drawing sheets, wherein:—

FIGS. 2a and 2b shows two specific applications of a kill-cord;

FIG. 2c shows a kill cord for use in the device of FIG. 2b;

FIG. 3 details one simple kill-cord latch member;

FIGS. 8a, 8b & 8c show aspects of an operator clip in accordance with one embodiment;

FIGS. 9a, 9b & 9c show aspects of a lanyard in accordance with the invention;

FIGS. 10a-10e show aspects of an operator clip in accordance with a couple of embodiments;

DETAILED DESCRIPTION OF THE PREFERRED EMBODIMENTS

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Figure 1A:
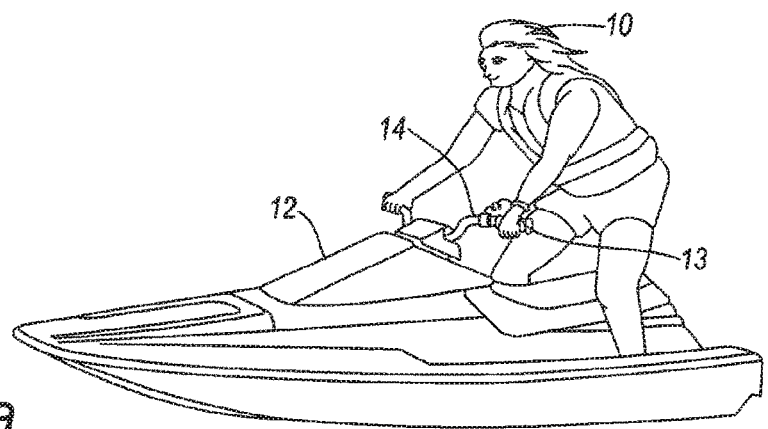
FIGS. 1a and 1b show a jet-ski rider and a handlebar kill-cord.
Figure 1B:
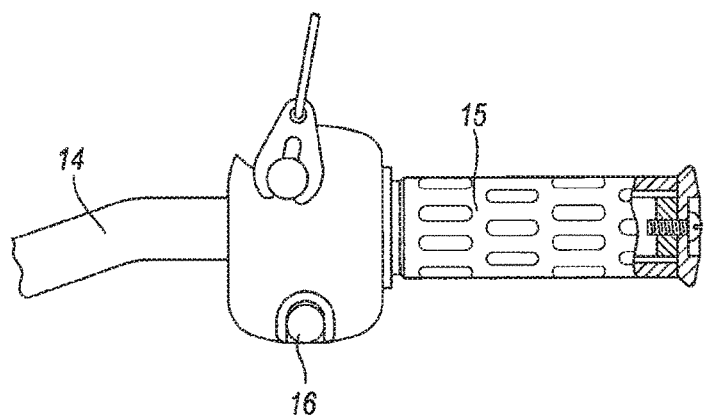
Figure 2A:
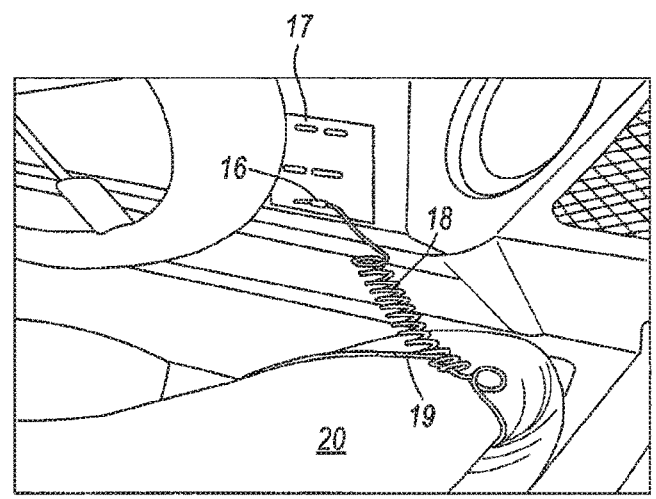

Referring to FIG. 1a, there is shown a jet-ski rider 10 riding a jet-ski personal watercraft 12 (so-called because of the water-jet propulsion system used by such craft, which encloses an impellor such that moving propellers cannot cause injury to swimmers and the like in the event of contact, by way of holding onto handlebars 14, which provides limited rotational movement in operation. FIG. 1b shows a left-hand handlebar grip 15, onto which a left hand 13 of the operator grips in use; latch-key member 16 is resiliently retained to the handlebar by way of a resilient biasing means associated with a motor control switch; The latch-key member 16 has a lanyard not shown which is looped around a wrist of the jet-ski rider. In the event that the operator leaves the jet-ski, either voluntarily or in the event of an incident, when the latch-key member is either removed by hand or the lanyard will pull on the latch-key member and the latch-key member shall become disengaged and thereby controlling a motor/drive control circuit whereby the jet-ski is prevented from continuing under power—although any momentum of the craft will prevent the jet-ski from stopping instantaneously. FIG. 2a shows an example of the management of a marine kill-cord in use; a latch-key member 16 is fastened to a tiller console socket 17 at a distal end of a coiled lanyard 18, which has a clip 19 at a proximal end, which operator clip and proximal lanyard are fastened about the leg of an operator 20, as shown.

FIG. 2b shows an operator 21 being a treadmill athlete upon a track 23 treadmill 20. The operator 20 is connected via a kill-cord 24 to the display/control terminal 22. FIG. 2c shows the kill-cord 24 with a coiled section 27, having a clip member 25, which can conveniently be attached to an item of clothing such as the waist of the shorts 28. At the other end of the lanyard is a control/display interface plug, which may comprise a magnetic connector, whereby, when jolted, is released from the display/control terminal 22, whereby to stop the movement of the conveyor belt style track 23.

Figure 4A:
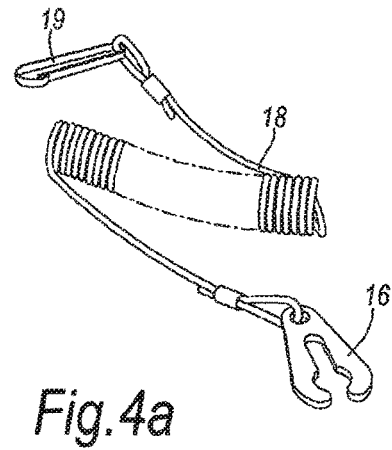
FIGS. 4a & 4b show first and second kill-cord arrangements.
Figure 4B:
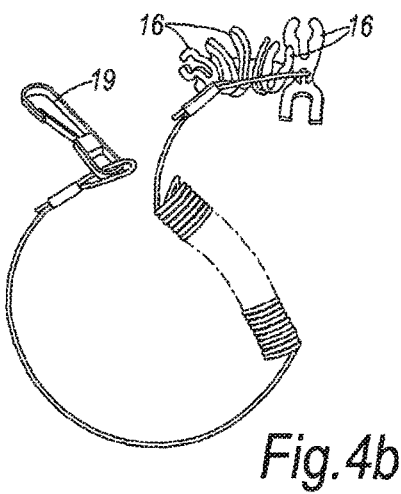
Figure 5:
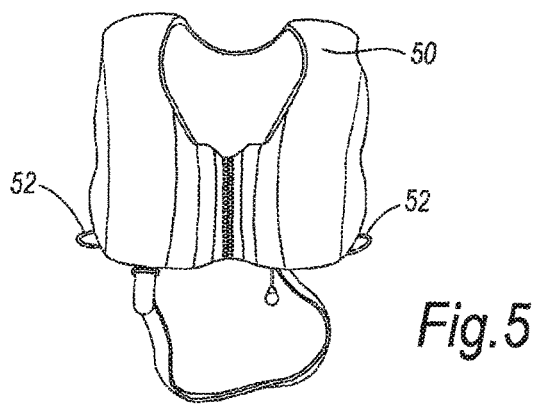
FIG. 5 shows a life-jacket for use with a kill-cord.

FIG. 3 comprises a lanyard 18 attached to a simple kill-cord latch-key member 16, which member comprises a generally "U"-shaped planar element having an aperture 30 at a first end, through which the lanyard 18 can be connected, and the "U"-shaped elongate indentation of the "U" having opposed arcuate cut-outs 32 adjacent the opening. In use, the arcuate cut-out elements surround a resiliently biased connection member of the kill switch control element. In detail, FIG. 4a shows a known kill-cord, having a metal operator clip 19 at one end of a coiled lanyard 18 and a single latch-key member at the other end of the lanyard. FIG. 4b shows a similar arrangement save that there are a plurality of different latch-key members 16, suitable for a number of different kill-switch systems, for use by a harbour pilot, for example. It is understood that the invention can be implemented with many different types of latch-key. FIG. 5 shows a life-jacket 50 for use with a kill-cord, wherein loop members 52 are provided to enable an operator clip to engage with the life-jacket.

Figure 6:
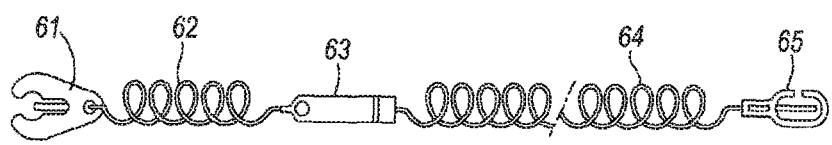
FIG. 6 shows a first kill-cord in accordance with the invention.

Referring now to FIG. 6, there is shown a first kill-cord in accordance with the invention. This kill-cord system comprises a latch-key member 61 (of a type distinct to that shown in FIG. 3) a first lanyard section 62, an alarm device 63, a second lanyard section 64; and an operator clip detector member 65. The first lanyard section is securely fastened to the latch-key member and alarm device and the second lanyard section 64 is securely fastened to the alarm device and at a first end and the operator clip at the other end.

Figure 7:
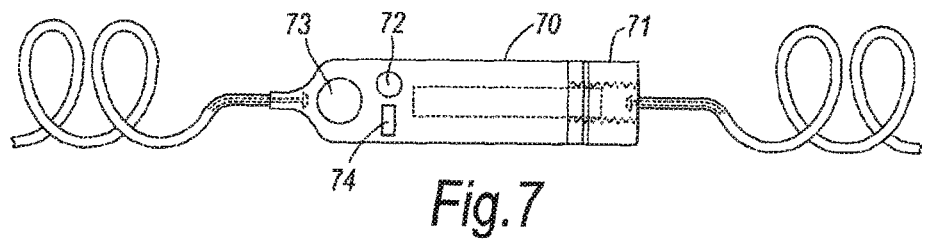
FIG. 7 details an active element of the kill-cord show in FIG. 6.

The alarm device is shown in greater detail in FIG. 7, the device comprises a body 70, having a screw-threaded cap 71, a seal such as an O-ring being employed to ensure a watertight assembly. The main body being fastened to the latch-key member 16 by a cable which, in a preferred embodiment, comprises an electric circuit to be established as part of the warning system; the cap 71 is associated with the operator clip 65 and is also provided with a lanyard 64 also comprising an electric circuit to be established as part of the warning system. At a minimum level of security, the control circuit conveniently comprises a circuit that detects whether the operator clip member switch is closed or open. Conveniently, the alarm device includes a circuit that will allow the invention to perform in a number of modes. The length of the lanyard is conveniently of the order of 1 m, although it will be appreciated that the exact length depends upon the particular situation, for example, the size of the vehicle. By having the operator clip being associated with a leg of an operator, then movement from a sitting to a standing position is effectively unrestricted.

The alarm device 70 conveniently comprises at least one indicator LED, whereby to confirm operation of the device. It will be appreciated that a number of variants can be made; for example, a two LED system could be implemented, conveniently the LEDs having different colours 72, 74: A green LED could indicate to a user of the invention that the system was operational or was capable of operating; a red LED could indicate that the device was either faulty or for the end receiver to know that the device had been activated. The alarm device is also preferably equipped with an audible alarm 73. The brightness/intensity/loudness, etc. of the alarm may increase the longer the alarm is in operation. The skilled man can simply arrange a number of indicators as is deemed appropriate, visual, audible, vibratory, mild electrostatic shock etc. Conveniently more than one alarm can be provided. Conveniently alarms are associated with the boat, whereby to provide a greater likelihood of the alarm being acted upon.

The present invention can also be programmed with a diagnostic facility to enable a user to determine whether the system is operable prior to the use of the alarm device. For example, a diagnostic test could be performed to ensure that the integrity of the electrical energy storage cell and that the contact arrangements associated with the latch-key member and operator clip. Such a test could conveniently be performed by pressing a micro switch once or a number of times (as programmed to a particular requirement). For example, the diagnostic test could be performed at any point before the system is armed by pressing a micro switch once, and a green LED would flash briefly to indicate that the system is working properly. Should the diagnostic test prove unsatisfactory then the system would indicate that a problem existed via, for example, a single red LED, which would remain illuminated until expiry of the electrical cell for the circuit, whereby to ensure the user knows not to use the system for any reason.

FIGS. 8a and 8b show, respectively, plan and side views of an operator clip 80, whereby to enable the alarm devices to indicate, whether the clip has been operated properly. Operator clip 80 comprises a general hook element 81 around a handle body 84, with a control key 82 operable to slide with respect to the operator clip body 84, whereby plunger 83, which comprises part of the indicator circuit is broken when the lanyard is placed within the hook, preventing the plunger from abutting the inside of the hook. It will be appreciated that other methods of breaking a connection are also possible. In the embodiment of FIG. 8c, being a cross-section through the operator clip has a spring biasing member 85 urging plunger against the hook. Whilst the circuit is shown as comprising the hook element, the circuit (break or make) could be determined if associated with the slide key 82 within its recess, thereby removing the possibility of salt water enabling a circuit to be made, when otherwise broken by the lanyard 18. It is preferred that moving parts are shielded from seepage of fluids, especially, for example, from salt water, which is known to be corrosive, especially to metallic switch contacts. Conveniently rubber/plastics hoods are used to protect moving parts and electrical and electronic parts.

FIG. 9a shows how a reinforcing wire or cord 90 within a lanyard can be terminated with a moulded termination element 91, whereby an operator clip, latch-key member or alarm device can be retained with respect to the lanyard. FIG. 9b shows an arrangement of three conductive wires 92, 93, 95 about a reinforcing wire 90, being surrounded by a flexible plastics body 95. FIG. 9c shows how the lanyard 18 can be conveniently comprised of a coiled wire of a 20 mm diameter.

FIG. 10a shows a further form of latch-key member such as a yoke 100, in plan view, and FIG. 10b shows the same in cross-section. In this instance, a circuit element 101 is closed when the latch-key is engaged about the corresponding resilient retaining system, by abutting against an actuation element 102. Thus, once the kill-cord has been inserted into a kill switch assembly, the actuation element is depressed and the engine can be operated and the alarm system is enabled so that the alarm shall be triggered in the event that a corresponding operator clip has not been secured. FIG. 10c shows a still further type of key wherein the yoke 104 can be associated with a kill switch assembly in two positions. The clip, instead of being a general "Y" shape becomes more of a general "tall U" shape, defined by two opposed arms. The mutually opposing faces 105, 105' of the arms have two "U" sections 106, 106', 107, 107' separated by opposing ridges 108, 108' which are closer together, whereby to provide a yoke that can be located with respect to a kill switch assembly in two states; one for placement of the yoke with respect to the kill switch assembly only and one for placement with respect to the kill switch assembly such that the engine can be operated. This enables the yoke to be associated with the kill switch—so that it can be conveniently placed in a known position, yet the alarm does not sound, since the yoke has not been placed within the engine kill switch assembly to enable the engine to operate. FIG. 10d shows the yoke in profile; the thickness of the yoke arm portions 107, 107' being such that accidental operation of the engine is not possible. It will be appreciated that many variations of this type of system can be realised, wherein a two-state switch can enable simple retrieval of a yoke, without the irritation of the alarm being sounded when the engine is not required. FIG. 10e shows in perspective view from above a lanyard in accordance with the invention with a latch key element 61, operably associated with, for example, a kill switch assembly integrated with a speed control assembly of a boat, a coiled helical lanyard 18 and an operator clip 80 having an alarm system associated with a clip with switch plunger 83. The plunger 83 can be readily sourced from a number of marine switch supplies. It will be apparent to the skilled man that many different variations can be made; what is important to ensure that not only is a kill cord is attached to the switch assembly of the control for motor, outboard or inboard, whether electric, internal combustion or otherwise does not operate to create movement unless the kill cord is associated with the operator.

Figure 11A:
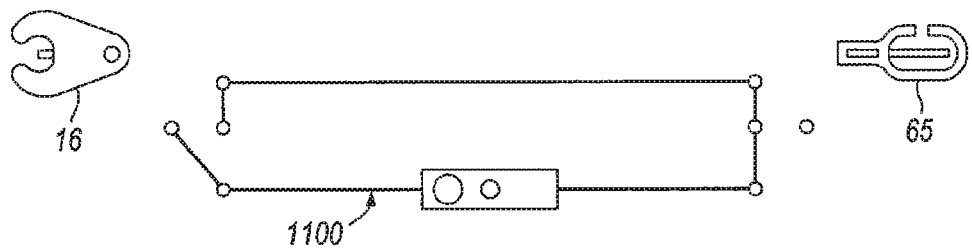
FIGS. 11a, 11b & 11c show three separate modes of operation of an operator clip in accordance with one embodiment of the invention.
Figure 11B:
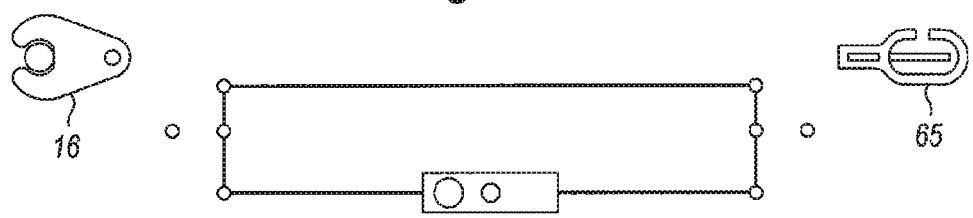
Figure 11C:
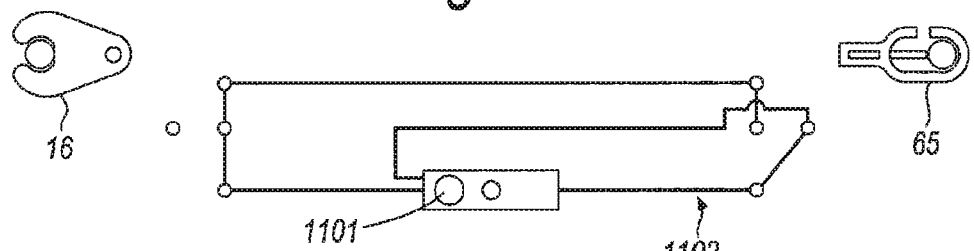

FIG. 11a shows a simple circuit 1100 where the latch-key 16 is not inserted into the retaining member engine actuation switch assembly. The operator clip 65 has not been arranged such that the switch is open and therefore the alarm will not operate. FIG. 11b shows that the latch-key has been placed correctly in the retaining member engine actuation assembly and so the alarm will operate, since the operator clip is not attached properly. In FIG. 11c, with both the latch-key member 16 and the operator clip 65 the circuit is open and an alarm is not raised, although there may be an actuation of a comfort indicator light 1101 per circuit 1102 to confirm that the circuit is operating properly. To prevent the system being by-passed a number of by-pass protection systems could be deployed. A timer may be present, whereby to ensure removal of the latch-key after use of the motorised vehicle. The method of ensuring that the clip member is actuated by the presence of a wire lanyard could be confirmed, for example, by acknowledging the presence of a conductor wire within the clip, to prevent, for example, the clip being maintained in a depressed state, to avoid the alarm being sounded.

Figure 13:
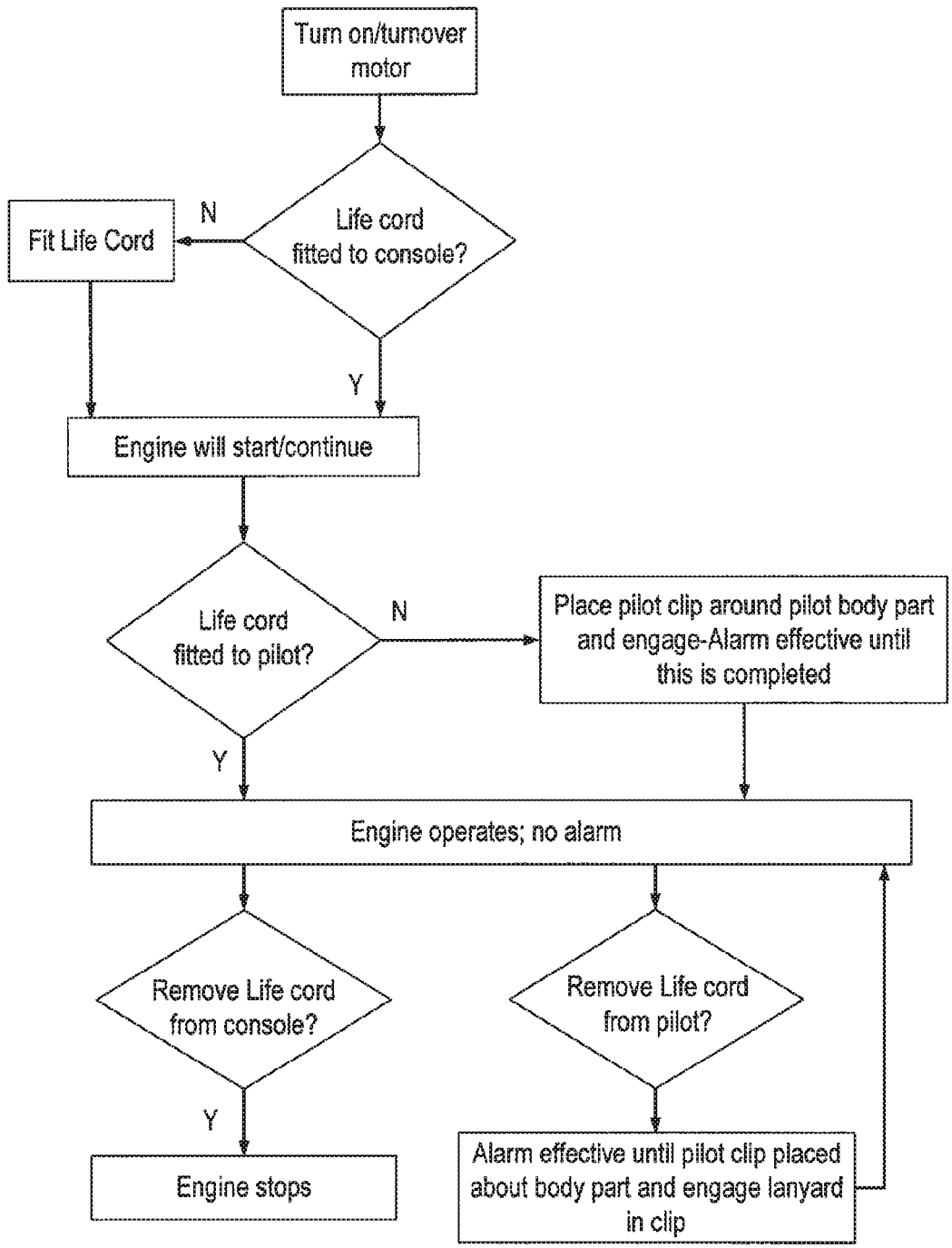

FIG. 13 is a flowchart of operation; engine will not start if life cord not associated with console switch; alarm shall sound/flash/otherwise indicate warning if an operator clip is not employed such that circuit is operational. In this method of operation, an attempt is made to turn over/start the motor; if the kill cord is fitted to the console (or outboard, if appropriate), then the engine will start. In the event that the life cord is properly associated with the operator or pilot, then the engine will operate without an alarm. In the event that the life cord is not fitted, then an alarm will be effective until the kill-cord is associated with the operator. In the event that the life cord, by way of the latch key, is removed from the console or outboard, then the engine will stop. In the event that the life cord is removed from the operator, then an alarm will sound until the life cord is properly associated about a body part of the operator. It will be appreciated that many variations can be performed in accordance with the invention. For example, the motor could stop upon disassociation of the life cord from the operator. It will be apparent that the system could be arranged differently. For example, the system could be arranged such that the motor will not start unless both the operator clip and latch key are properly engaged, the alarm sounding until the system is fully connected. Again, with different equipment, it will be appreciated that the functioning of the apparatus needs to be stopped when the operator is not in a position to be in control, though accident, inadvertence, forgetfulness or otherwise.

A typical alarm unit could comprise, for example, a rechargeable 1.5V, 4400 mAh Lithium-Ion battery and such an electrical battery can provide sufficient electrical energy to enable a basic circuit to operate over a season. In the alternative, non-rechargeable batteries may be employed: these batteries could be inserted as a matter of course, whereby new batteries are always employed, as a precaution. Notwithstanding this, a procedure should be put in place such that the electrical cell is always checked so that they achieve a minimum output prior to deployment, whether rechargeable or not.

Figure 12:
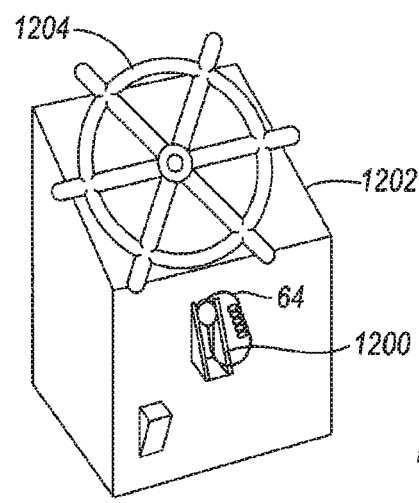
FIG. 12 shows how a kill-cord in accordance with the invention can be stored when not in use; and, FIG. 13 shows a flow chart as to one method of operation of the present invention.

In a further embodiment, the alarm device can include a rechargeable electrical cell or cells, which rechargeable cells have an inductive coil arrangement whereby the device, can be charged by placement within a cradle (or similar), without the use of any exposed metallic contact points, whereby corrosion opportunities between a charging station and the elements and/or between the alarm device and the elements are minimised. A further advantage that ensues is that without the need to constantly plug and unplug the device, there is a removal of a common failure point of rechargeable devices, being the wear and tear on the socket of the device and the attaching cable. FIG. 12 shows a cradle 1200 operably attached to a control module/operator console/tiller arrangement 1202 of a motorised vehicle equipped with controls such as a steering wheel 1204. Notwithstanding this, the main disadvantages of inductive charging are its lower efficiency and increased resistive heating in comparison to direct contact, but if an inductive charging unit is associated with the control system of the boat or other type of vehicle which is provided with the alarm system, then the system can be neatly stored where required. Another downside is that inductive charging also requires drive electronics and coils in both device and charger, increasing the complexity and cost of manufacturing.

Should the kill cord be connected to the vessel and the other end per chance already be pre-looped for any reason, then the device can be arranged such that it functions in alarm mode e.g. provides a ten second continuous tone to alert the operator of the pre-loop in order that he can then undo the pre-loop. Once undone the device could then revert to a ten second intermittent beep until it is properly arranged around the operator's leg, at which point it would fall silent, noting that the preferred (recognised and advised) method of wearing a kill cord is around the leg as it does not interfere with the steering of the vessel.

In the fitness industry, there are many types of power assisted exercise machines, the treadmill being the most common. Many of such machines are provided with kill switch arrangements, but these are rarely employed. User generated videos on social media websites bear witness to many accidents that have occurred in the use of power assisted exercise machines, especially the treadmill. With reference to FIGS. 2b and 2c, the operator clip can be adapted such that it emits an alarm when not properly associated with the operator of the exercise machine. Additional features could be provided, for example, such that a brake is applied to a belt associated with the treadmill.

In the field of power tools, the present invention can also address issues of safety that have previously not been properly been addressed. For example, chain saws are frequently left unattended in a running mode. Additionally arborists, from time to time encounter situations where their chainsaw becomes disassociated form the arborist, yet the chain saw remains operational, although some saws are fitted with chain brakes, operating triggers may still function, for example through becoming entangled with branches. A kill switch operable to deactivate when a chain saw becomes disassociated with an operator would prevent many serious injuries. For example, when a tree has been felled, it is typical to trim limbs (branches) from the trunk, prior to cutting the trunk into smaller sections and Dan trimming off all the limbs. A not-uncommon scene is that a chainsaw can catch and kick out of the hands of the operator and the chain can cut into a leg, typically the quadriceps, in an instant.

In 1999, according to the U.S. Consumer Products Safety Commission, there were over 28,500 chain saw injuries. More than 36% were injuries to the legs and knees, with the average chainsaw injury requiring 110 stitches. It will be appreciated that medical care costs and subsequent rehabilitation costs are typically considerable and worker's compensation costs can be significant. Loss of production as well as loss of quality of life for the injured cannot be adequately quantified, but may in fact represent the single largest cost. There are few situations where safety has a more immediate payback than in the logging industry. The provision of a kill switch together with an alarm would undoubtedly increase safety record of such an industry. In the field of construction, jack-hammer incidents can be significant, and other powered tools can be adapted to be provided with kill switches in accordance with the invention, whereby when they become disassociated with an operator, they kill a motor of the apparatus such that any damage caused by the motor continuing is limited.

The invention provides a simple to use operator clip, lanyard and kill switch arrangement that is provided with a simple and robust circuitry to enable the correct use of an essential safety device, namely the kill-cord assembly and propulsion control device, whether it be a boat propeller, a rear-wheel of a motor-cross bike or otherwise separated from the vehicle, for whatever reason. When employed for marine and watercraft use in general, it is prudent to have assemblies where electric circuits are involved to be waterproofed, having seals, gaiters and rubber boots as appropriate and drain holes in areas where water may accumulate to minimise or overcome any problems that might otherwise occur with the presence of water, especially saline water.

The invention claimed is:

1. An apparatus having a motorised drive assembly operably controlled by an operator and having a kill switch arrangement, the kill switch arrangement comprising:
   a switch assembly;
   a latch-key member;
   a lanyard having a first end and a second end;
   an operator clip fastenable to an operator; and
   at least one alarm element;
   wherein the lanyard is connected to the latch-key member at the first end;
   wherein the lanyard is connected to the operator clip at the second end;
   wherein the switch assembly permits operation of the motor drive when connected with the latch-key member;
   wherein the switch assembly prevents operation of the motor drive when disconnected with the latch-key member; and
   wherein the at least one alarm element operates when the operator clip has not been fastened to the operator.

2. An apparatus according to claim 1, wherein the motor drive is associated with a motor of a vehicle wherein the motor does not operate when the latch-key member is not operably associated with the switch assembly.

3. An apparatus according to claim 1, wherein the motor drive is associated with an output of a motor of the apparatus such that the motor cannot enable propulsion of the apparatus to occur when the latch-key member is not operably associated with the switch assembly.

4. An apparatus according to claim 3, wherein the motor operates through a gearbox/clutch arrangement, and wherein the apparatus permits movement of the motor, but prevents drive from being transmitted to a drive output.

5. An apparatus according to claim 1, wherein the latch-key member is associated with the switch assembly by way of a system selected from the group comprising: a detent system, a micro-switch, a magnetic system and a resiliently biased arrangement.

6. An apparatus according to claim 1, wherein the at least one alarm element is associated with at least one of the latch-key and the operator clip.

7. An apparatus according to claim 1, wherein the at least one alarm element is connected by a first lanyard element to the latch-key and is connected by a second lanyard member to the operator clip.

8. An apparatus according to claim 1, wherein the at least one alarm element is operably adjacent one of the latch-key and the operator clip and is connected by the lanyard member to the respective operator clip and latch-key.

9. An apparatus according to claim 1, wherein the at least one alarm element is associated with the apparatus in a plurality of locations.

10. An apparatus according to claim 1, wherein the at least one alarm element comprises at least one element selected from the group comprising: a warning buzzer, or other sound device, a light source, a strobe light, and a vibratory device.

11. An apparatus according to claim 2, wherein the vehicle is selected from the group comprising: a motor boat, a jet-ski, a golf buggy, a motorcycle, a lawn-mower, and a tractor.

12. An apparatus according to claim 1, wherein the apparatus is a motor boat and the at least one alarm element is associated with at least one of the following: an outboard motor; an inboard motor; and an area about a tiller or a steering wheel of an operator console, whether on a fly-bridge or on a lower or single deck.

13. An apparatus according to claim 11, wherein the switch assembly is associated with the vehicle in a plurality of locations.

14. An apparatus according to claim 11, wherein the motorised vehicle is a motor boat and the switch assembly is associated with at least one of the following: an outboard motor; an inboard motor; and an area about a tiller or a steering wheel of an operator console, whether on a fly-bridge or on a lower or single deck.

15. An apparatus according to claim 1, wherein the apparatus is a motorised treadmill gymnasium apparatus, and wherein the motorised drive assembly drives the motorised treadmill gymnasium apparatus.

16. An apparatus according to claim 1, wherein the apparatus is a motorised tool apparatus selected from a group comprising an agricultural tool, a chain saw, a jumping-jack (compactor), a power saw, a woodworking tool, a lathe, a milling machine, a nail gun, a linishing machine, and a drilling machine, each tool respectively having a drive motor operable to drive said respective agricultural tool, compactor movement, power saw action, woodworking tool, rotary lathe action, milling rotary drive tool, nail gun drive motor, linishing belt drive motor, and drill motor tool.

17. A kill-switch arrangement for use in claim 1.

18. A kill-switch operator clip operably attached to/with an operator for use in claim 1.

19. A kill-switch alarm element for use in claim 1, wherein the alarm element operates in the event that the operator clip has not been properly associated with the operator and wherein the alarm element can provide at least one of an audible, vibratory, visual, electrical indicators or a combination of such.

20. A kill-switch alarm element for use in claim 1, wherein the alarm element operates in the event that the operator clip has not been properly associated with the operator and wherein the alarm element can provide at least one of an audible, vibratory, visual, electrical indicators or a combination of such, and wherein the alarm element changes in intensity and/or provides further alarm indications as a duration of alarm operation increases.

* * * * *